(12) United States Patent
Sakamoto (10) Patent No.: US 7,338,212 B2
(45) Date of Patent: Mar. 4, 2008

(54) WHEEL SUPPORTING ROLLING BEARING UNIT

(75) Inventor: Junshi Sakamoto, Fujisawa (JP)

(73) Assignee: NSK, Ltd., Tokyo (JP)

( * ) Notice: Subject to any disclaimer, the term of this patent is extended or adjusted under 35 U.S.C. 154(b) by 149 days.

(21) Appl. No.: 10/526,549

(22) PCT Filed: Aug. 29, 2003

(86) PCT No.: PCT/JP03/11113

§ 371 (c)(1),
(2), (4) Date: Mar. 3, 2005

(87) PCT Pub. No.: WO2004/022992

PCT Pub. Date: Mar. 18, 2004

(65) Prior Publication Data

US 2006/0165331 A1   Jul. 27, 2006

(30) Foreign Application Priority Data

Sep. 6, 2002   (JP) ............................ P2002-261194

(51) Int. Cl.
*F16C 19/00*   (2006.01)
(52) U.S. Cl. ..................... 384/544; 384/482; 384/486
(58) Field of Classification Search ................ 384/544, 384/537, 486, 482, 589
See application file for complete search history.

(56) References Cited

U.S. PATENT DOCUMENTS

2002/0025093 A1* 2/2002 Sahashi et al. ............. 384/544

2005/0157968 A1   7/2005   Sakamoto

FOREIGN PATENT DOCUMENTS

| JP | 7-113418 A | 6/1996 |
|---|---|---|
| JP | 8-319379 | 12/1996 |
| JP | 10-252762 | 9/1998 |
| JP | 2001-221243 | 8/2001 |
| JP | 2001-241450 | 9/2001 |
| JP | 2002-227858 | 8/2002 |
| JP | 2002-323056 | 11/2002 |
| JP | 2003-148626 | 5/2003 |
| JP | 2003-269617 | 9/2003 |
| WO | WO 03/071146 A1 | 8/2003 |
| WO | WO 03/071148 A1 | 8/2003 |
| WO | WO 03/074890 A1 | 9/2003 |

OTHER PUBLICATIONS

Supplementary European Search Report dated Jun. 6, 2007 (three (3) pages).

* cited by examiner

*Primary Examiner*—William C. Joyce
(74) *Attorney, Agent, or Firm*—Crowell & Moring LLP (57) ABSTRACT

In a wheel supporting rolling bearing unit, both end openings of a space in which balls 14, 14 are provided are sealed with seal rings 16c, 16d each having two to three seal lips. A rolling resistance that changes based on a preload is regulated in a range of 0.15 to 0.45 N·m, and a total running resistance of both seal rings 16c, 16d based on a friction between the seal lips and counter surfaces is regulated in a range of 0.06 to 0.4 N·m.

2 Claims, 8 Drawing Sheets

WHEEL SUPPORTING ROLLING BEARING UNIT

TECHNICAL FIELD

The present invention relates to improvement in a wheel supporting rolling bearing unit for supporting rotatably a wheel on a suspension system of a vehicle (car).

BACKGROUND ART

Figure 10:
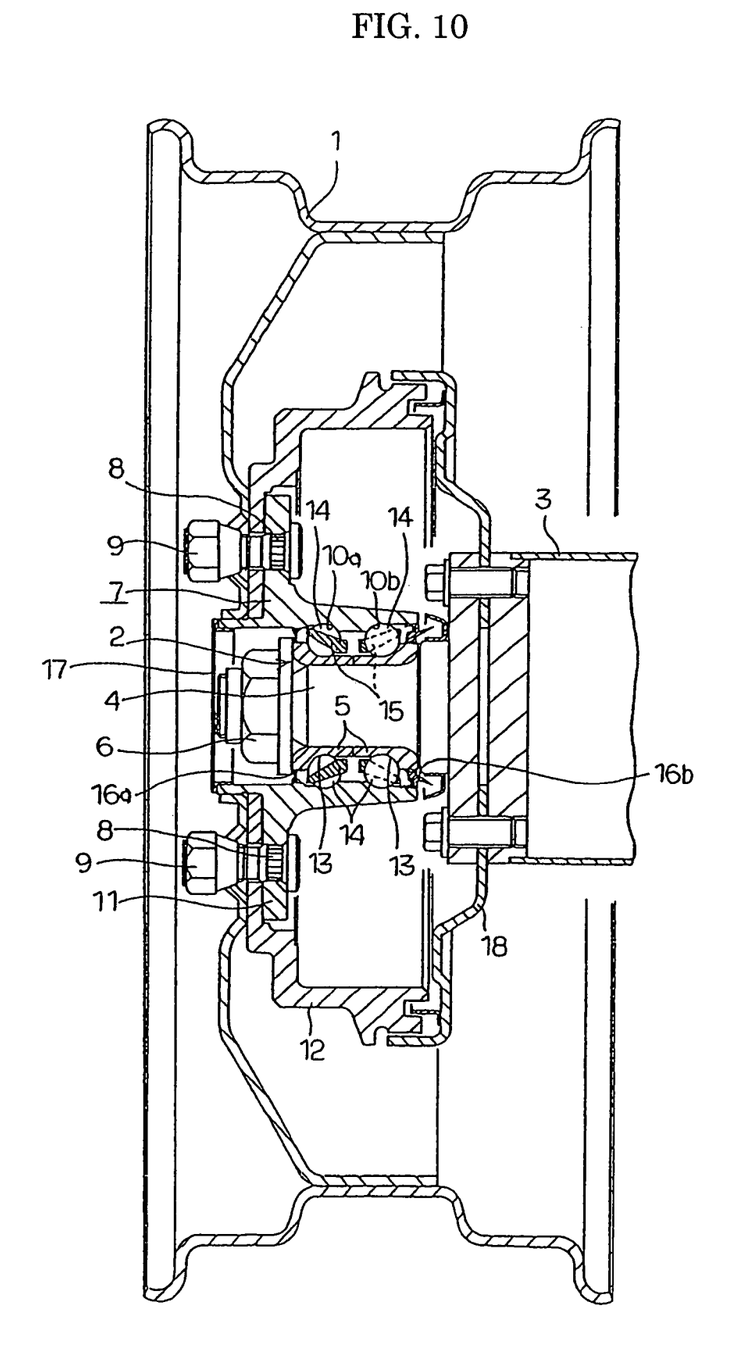
FIG. 10 is a sectional view showing a first example of a wheel supporting rolling bearing unit, which is well known in the prior art, in a state that such unit is fitted into the suspension system.
Figure 11:
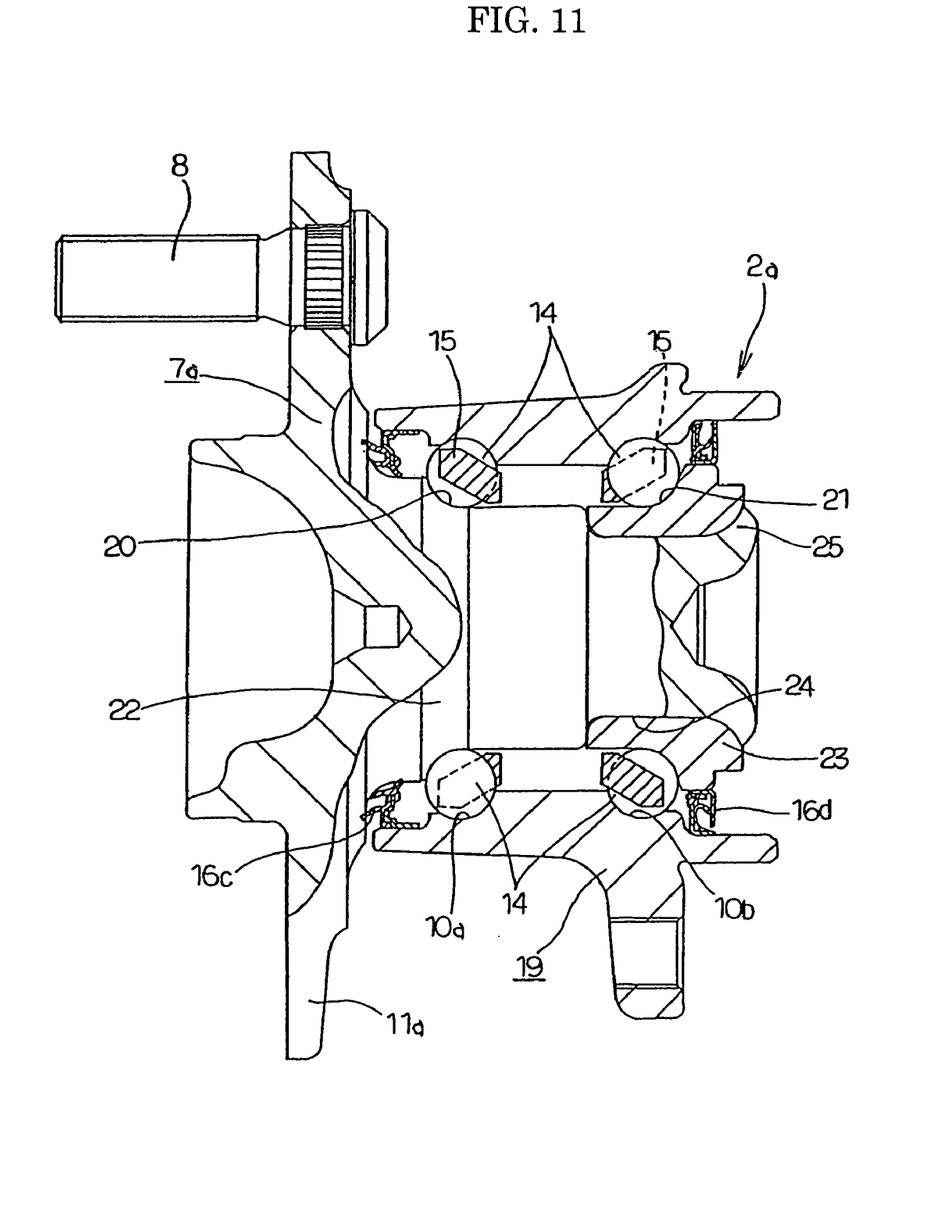
FIG. 11 is a sectional view showing a second example of the same.

As the wheel supporting rolling bearing unit, structures shown in FIGS. 10 and 11 are set forth in JP-A-2001-221243, for example. First, a structure of a first example shown in FIG. 10 will be explained hereunder. A wheel 1 constituting the wheel is supported rotatably on an end portion of an axle 3 constituting a suspension system by a wheel supporting rolling bearing unit 2. More particularly, inner rings 5, 5 as a stationary side raceway ring, which constitutes the wheel supporting rolling bearing unit 2, are fitted onto a supporting shaft 4 fixed to the end portion of the axle 3, and then the inner rings 5, 5 are fixed with a nut 6. Meanwhile, the wheel 1 is coupled/fixed to a hub 7 as a rotary side raceway ring, which constitutes the wheel supporting rolling bearing unit 2, by a plurality of stud bolts 8, 8 and nuts 9, 9.

Double row outer ring raceways 10*a*, 10*b* that act as a rotary side raceway surface respectively are formed on an inner peripheral surface of the hub 7, and a fitting flange 11 is formed on an outer peripheral surface of the same. The wheel 1 as well as a drum 12 constituting a baking system is coupled/fixed to a one-side surface (an outside surface in the first example, a left side surface in FIGS. 10 and 11) of the fitting flange 11 by the stud bolts 8, 8 and nuts 9, 9.

Balls 14, 14 are provided rollably between the outer ring raceways 10*a*, 10*b* and inner ring raceways 13, 13, which are formed on outer peripheral surfaces of the inner rings 5, 5 to act as the stationary side raceway surface respectively, every plural pieces in a state that these balls 14, 14 are held in cages 15, 15 respectively. A double row angular contact ball bearing having a back-to-back arrangement is constructed by combining respective constituent members mutually in this manner, so that the hub 7 is supported rotatably around the inner rings 5, 5 to bear the radial load and the thrust load. In this case, seal rings 16*a*, 16*b* are provided between inner peripheral surfaces of both end portions of the hub 7 and outer peripheral surfaces of end portions of the inner rings 5, 5 to isolate a space in which the balls 14, 14 are provided from the external space. In addition, an opening portion of an outer end (Here, an "outside in the axial direction" means the outside of the hub in the width direction when such hub is fitted to the vehicle. Similarly, an "inside" means the inside of the hub on the middle side in the width direction.) of the hub 7 is covered with a cap 17.

Upon using the above wheel supporting rolling bearing unit 2, as shown in FIG. 10, the supporting shaft 4 onto which the inner rings 5, 5 are fitted and fixed is fixed to the axle 3 and also the wheel 1, to which a tire (not shown) is fitted, and the drum 12 are fixed to the fitting flange 11 of the hub 7. Also, a braking drum brake is constructed by assembling in combination the drum 12, a wheel cylinder and shoes (not shown) supported on a backing plate 18 fixed to the end portion of the axle 3. Upon braking, a pair of shoes provided to the inner diameter side of the drum 12 are pushed against an inner peripheral surface of the drum 12.

Next, a structure of a second example shown in FIG. 11 in the prior art will be explained hereunder. In the case of this wheel supporting rolling bearing unit 2*a*, a hub 7*a* as the rotary side raceway ring is supported rotatably by a plurality of balls 14, 14 on the inner diameter side of an outer ring 19 as the stationary side raceway ring. Therefore, the double row outer ring raceways 10*a*, 10*b* as the stationary side raceway surface are provided on the inner peripheral surface of the outer ring 19 respectively, and first and second inner ring raceways 20, 21 as the rotary side raceway surface are provided on the outer peripheral surface of the hub 7*a* respectively.

The hub 7*a* is constructed by using a hub main body 22 as a main shaft member and an inner ring 23 in combination. A fitting flange 11*a* for supporting the wheel is provided to an outer end portion of the outer peripheral surface of the hub main body 22, and the first inner ring raceway 20 is provided to an middle portion thereof, and also a small-diameter stepped portion 24 that is smaller in diameter than a portion in which the first inner ring raceway 20 is formed is provided to the middle portion thereof near an inner end. Then, the inner ring 23, to an outer peripheral surface of which the second inner ring raceway 21 having a circular-arc sectional shape is provided, is fitted onto the small-diameter stepped portion 24. In addition, an inner end surface of the inner ring 23 is pressed with a caulking portion 25 that is formed by elastically deforming an inner end surface of the hub main body 22 outward in the radial direction. Thus, the inner ring 23 is fixed to the hub main body 22. Further, seal rings 16*c*, 16*d* are provided between an inner peripheral surface of the outer ring 19 on both end portions and the outer peripheral surface of the middle portion of the hub 7*a* and the outer peripheral surface of the inner end portion of the inner ring 23 respectively. Thus, the spaces in which the balls 14, 14 are provided are isolated from the external space between the inner peripheral surface of the outer ring 19 and the outer peripheral surface of the hub 7*a*.

In this case, in the case of the above wheel supporting rolling bearing unit 2*a* shown in FIG. 11, the rigidity can be enhanced because the first inner ring raceway 20 is formed directly on the outer peripheral surface of the middle portion of the hub main body 22. In other words, the first inner ring raceway to be provided in the middle portion of the wheel supporting rolling bearing unit can be formed on the outer peripheral surface of the inner ring prepared as a separate body of the hub main body, and then this inner ring can be fitted/fixed onto the hub main body. In this case, unless an inference of the inner ring into the hub main body is increased, the rigidity is lowered, like a structure shown in FIG. 11, rather than the case where the first inner ring raceway 20 is formed directly on the outer peripheral surface of the middle portion of the hub main body 22. A working of fitting the inner ring as the separate body onto the hub main body from the inner end portion to the middle portion while keeping a large inference is troublesome. In contrast, as shown in FIG. 11, the wheel supporting rolling bearing unit 2*a* having the high rigidity can be constructed without trouble by employing the structure in which the first inner ring raceway 20 is formed directly on the outer peripheral surface of the middle portion of the hub main body 22.

In the case of the wheel supporting rolling bearing unit 2 (or 2*a*) as set forth in above JP-A-2001-221243, it is unavoidable that a torque (running resistance of the wheel supporting rolling bearing unit) required to turn the hub 7 (or 7*a*) is increased because of the presence of the seal rings 16*a*, 16*b* (or 16*c*, 16*d*) that close the opening portions on both ends of the space in which the balls 14, 14 are provided. As a result, since the running performances, mainly the acceleration performance and the fuel consumption performance, of the vehicle into which this wheel supporting rolling bearing unit is incorporated are worsened, improvement in the running performances is desired in view of the recent trend toward the energy saving. The technology to reduce the sliding resistance between the seal member and the sliding portion of the counter member by mixing plastic fine grains which are impregnated with the lubricant into the rubber composition constituting the seal member is known in JP-A-8-319379. However, no description is given in JP-A-8-319379 that suggests getting of the high-performance structure as a whole by applying the above rubber composition to the wheel supporting rolling bearing unit.

In addition, as the structure that reduced the running torque of the rolling bearing unit by reducing the resistance of the seal-ring providing portion, improvement in the inference of the seal lip as set forth in JP-A-10-252762 was considered in the prior art.

In the case of the wheel supporting rolling bearing unit as the subject of the present invention, even though the running torque should be reduced, the structure capable of keeping the wheel supporting rigidity to ensure the controllability and also preventing sufficiently the entering of the foreign matter into the internal space of the rolling bearing unit to ensure the durability of the rolling bearing unit is needed. In other words, the supporting rigidity must be assured by enhancing the rigidity of the rolling bearing unit to ensure the controllability, nevertheless the rolling resistance of respective rolling members is increased if a preload applied to respective rolling members is increased simply to enhance the rigidity, whereby the running torque cannot be reduced. Also, in case it is considered only that the sliding resistance of the seal ring is lowered simply, prevention of the entering of the foreign matter into the internal space of the rolling bearing unit cannot be sufficiently attained and thus the durability cannot be sufficiently assured.

A wheel supporting rolling bearing unit of the present invention has been made in view of such circumstances, and realizes a structure that has a high rigidity, an excellent durability, and a low running torque.

DISCLOSURE OF THE INVENTION

A wheel supporting rolling bearing unit of the present invention comprises a stationary side raceway ring, a rotary side raceway ring, a plurality of balls, and a seal ring, as in the above wheel supporting rolling bearing unit known in the prior art.

The stationary side raceway ring is supported/fixed on a suspension system in use.

The rotary side raceway ring supports/fixes a wheel in use.

A plurality of balls are provided between a stationary side raceway surface and a rotary side raceway surface, each of which has a circular-arc sectional shape, on mutually opposing peripheral surfaces of the stationary side raceway ring and the rotary side raceway ring.

A pair of seal rings seals opening portions on both end portions of a space in which the balls are provided between the mutually opposing peripheral surfaces of the stationary side raceway ring and the rotary side raceway ring.

One raceway ring, which is positioned inside in a radial direction, out of the stationary side raceway ring and the rotary side raceway ring consists of a main shaft member and an inner ring. Then, the main shaft member has a first inner ring raceway formed directly in a middle portion of an outer peripheral surface in an axial direction to serve as the stationary side raceway surface or the rotary side raceway surface and a small-diameter stepped portion formed on one end portion of the outer peripheral surface in the axial direction. Also, the inner ring on an outer peripheral surface of which a second inner ring raceway as the stationary side raceway surface or the rotary side raceway surface is formed is fitted/fixed onto the small-diameter stepped portion.

Also, the pair of seal rings have two or three seal lips which are formed of elastic material respectively and a top end edge of each of which slidingly comes into contact with a counter surface.

In particular, in the wheel supporting rolling bearing unit of the present invention, an axial load to apply a preload to the balls is set to 1.96 to 4.9 kN.

Also, a rigidity factor is set to 0.09 or more.

Also, a torque required to relatively run the stationary side raceway ring and the rotary side raceway ring at 200 $\text{min}^{-1}$ based on a friction between the seal lips provided to both seal rings and a counter surface is set to 0.06 to 0.4 N·m in total in both seal rings.

Also, a torque required to relatively run the stationary side raceway ring and the rotary side raceway ring at 200 $\text{min}^{-1}$ (200 RPM) based on a rolling resistance of each ball is set to 0.15 to 0.45 N·m.

Figure 12:
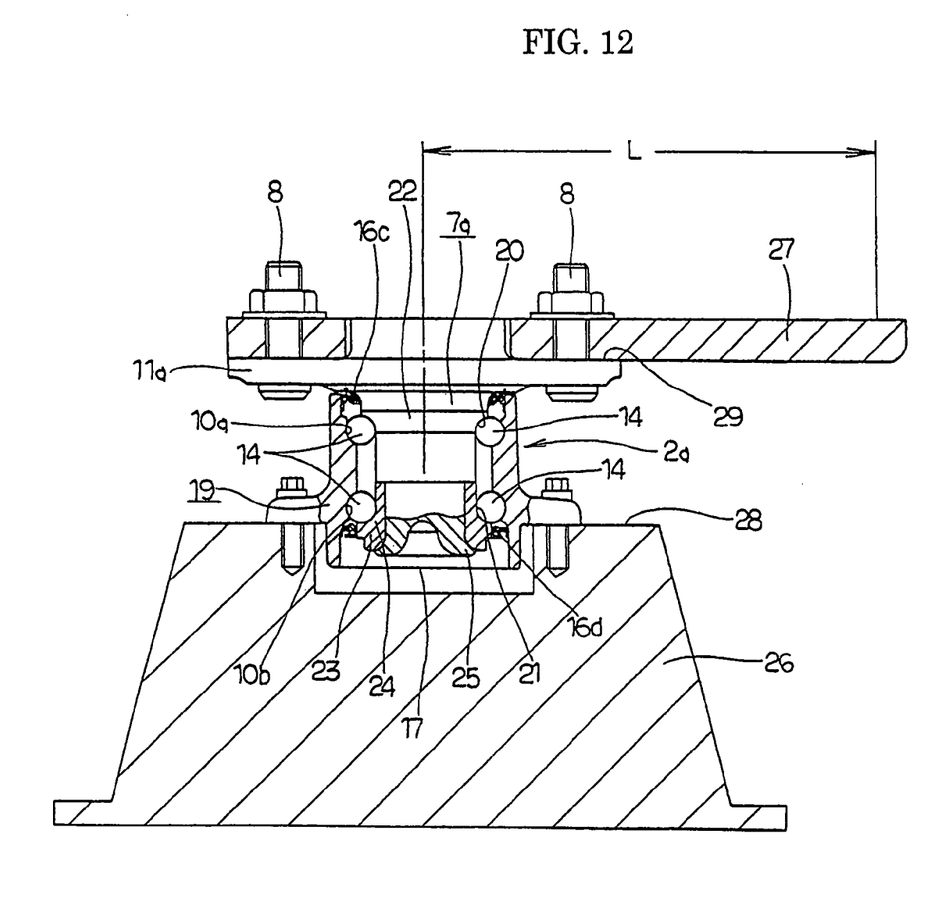
FIG. 12 is a sectional view showing a condition in which a rigidity of the wheel supporting rolling bearing unit is measured.

The rigidity factor set for thin this specification means a ratio (R/Cr) of the rigidity R [kN·m/deg] of the wheel supporting rolling bearing unit to a radial dynamic rated load Cr [N] of the wheel supporting rolling bearing unit. The rigidity R in this case is represented by an inclination angle between both raceway rings when a moment load is loaded to the rotary side raceway ring in a situation that the stationary side raceway ring constituting the wheel supporting rolling bearing unit is fixed. For example, the rigidity is measured as shown in FIG. 12. In this case, FIG. 12 shows the condition in which the rigidity R of the wheel supporting rolling bearing unit 2a shown in above FIG. 11 is measured.

In the measuring operation, the outer ring 19 as the stationary side raceway ring is secured to an upper surface of a fixing pedestal 26 and abase end portion (left end portion in FIG. 12) of a lever plate 27 is coupled/fixed to the fitting flange 11a of the hub 7a as the rotary side raceway ring. Then, the load is applied to the portion, which is part from a center of rotation of the hub 7a by a distance L corresponding to a radius of rotation of the tire, for example, on the upper surface of the lever plate 27 to apply the moment load of 1.5 kN·m to the hub 7a via the lever plate 27. Since the hub 7a is inclined from the outer ring 19 based on this moment load, this inclination angle is measured as an inclination angle [deg] of a clamp face 29 of the fitting flange 11a to an upper surface 28 of the fixing pedestal 26. Then, the rigidity R [kN·m/deg] is derived by dividing the moment load (1.5 kN·m) by this inclination angle. Then, the above rigidity factor is derived by dividing the rigidity R by the radial dynamic rated load Cr [N] of the wheel supporting rolling bearing unit 2a.

In the case of the wheel supporting rolling bearing unit of the present invention constructed as above, the running torque can be reduced sufficiently while assuring the necessary rigidity and the durability.

First, since the axial load to apply a preload to the balls is regulated in a range of 1.96 to 4.9 kN, the running torque can be reduced sufficiently while maintaining the rigidity and the durability. If the axial load is below 1.96 kN, the preload is not enough and then the rigidity of the wheel supporting rolling bearing unit becomes insufficient. Thus, the controllability of the vehicle into which the wheel supporting rolling bearing unit is incorporated becomes worse.

In contrast, if the axial load is in excess of 4.9 kN, the preload is applied excessively (a contact pressure of the rolling contact portion is increased excessively) and then the rolling resistance (running torque) of the wheel supporting rolling bearing unit is increased excessively. Then, a heating value at the rolling contact portion becomes too large, and then a temperature rise in the wheel supporting rolling bearing unit becomes conspicuous. Thus, the grease that is sealed in the bearing unit is ready to deteriorate immediately. As a result, the durability of the wheel supporting rolling bearing unit is lowered. Also, as the result of excessive increase of the contact pressure of the rolling contact portion, the rolling fatigue life of the stationary side raceway ring, the rotary side raceway ring and rolling contact surfaces of the balls is shortened, and the durability of the wheel supporting rolling bearing unit is lowered in this respect.

In contrast, in the case of the present invention, since the axial load to apply the preload to the balls is regulated in a range of 1.96 to 4.9 kN, the running torque can be reduced sufficiently while keeping the rigidity and the durability.

Also, since the rigidity factor is set to 0.09 or more, the controllability of the vehicle into which the wheel supporting rolling bearing unit is incorporated can be secured while maintaining the rigidity of the wheel supporting rolling bearing unit. Conversely speaking, the controllability becomes worse if the rigidity factor is below 0.09.

Here, because the higher rigidity factor is preferable from a viewpoint of assuring the controllability, an upper limit is not particularly defined. Any high value of the rigidity factor may be employed if other requirements are satisfied. Meanwhile, as the approach that is normally taken to enhance the rigidity factor, a value of the preload should be increased or a pitch diameter of the balls or a pitch between the balls arranged in double rows in the axial direction should be increased.

In this case, as described above, there is a limit to an increase of the preload. Also, there is a limit to increases of the pitch diameter and the pitch in the axial direction from a viewpoint of reduction in size and weight. Therefore, when the wheel supporting rolling bearing unit is made of normal steel material (the outer ring and the hub are made of S53C and the inner ring and the balls are made of SUJ2), an upper limit of the rigidity factor becomes almost 0.18. In this case, when a part (e.g., balls) or all of constituent elements of the wheel supporting rolling bearing unit are made of ceramics, the rigidity factor can be increased unless the preload and the pitch diameter and the pitch in the axial direction are increased. Therefore, in this case, the rigidity factor can also be increased to exceed 0.18.

Also, since the torque required to relatively run the stationary side raceway ring and the rotary side raceway ring at 200 $min^{-1}$ based on the friction between the seal lip provided in plural to both sealing rings respectively and the counter surface is set to 0.06 to 0.4 N·m, the running torque can be reduced sufficiently while assuring the durability of the wheel supporting rolling bearing unit.

That is, as the result of experiments made by the inventors of the present invention, it was understood that, insofar as the number of the seal lips is set to two or three in both seal rings, a validity of the sealing performance can be decided based on a total magnitude of the running resistances of both seal rings irrespective of the structure of the seal ring. Of course, from a respect of assuring the sealing performance of the seal ring that has the small running resistance, it is important that a difference in the running resistance between a pair of seal rings should be made small. From this respect, the running resistance of 0.03 N·m or more must be assured in the seal ring that has the small running resistance. Also, it was understood that, if the running resistance of the seal ring that has the small running resistance is set to 0.03 N·m or more and a total running resistance of a pair of seal rings is set to 0.06 N·m or more, the required sealing performance can be attained.

In the case of the wheel supporting rolling bearing unit of the present invention, since the torque of 0.06 N·m or more is assured, the sealing performance attained by the seal ring can be sufficiently assured by maintaining sufficiently the contact pressure of the slide contact portion between top ends of the seal lips constituting the seal ring and the counter surface. As a result, the durability of this wheel supporting rolling bearing unit can be ensured by preventing effectively the entering of the foreign matter such as a muddy water, or the like into the inside of the wheel supporting rolling bearing unit. Conversely speaking, if the contact pressure of the slide contact portion between the top ends of the seal lips and the counter surface to reduce the torque lower than 0.06 N·m, a function of preventing the entering of the foreign matter become insufficient and thus the durability of the wheel supporting rolling bearing unit is lowered.

In contrast, if the torque exceeds 0.4 N·m, it is difficult to suppress the running torque of the wheel supporting rolling bearing unit as a whole sufficiently low (0.85 N·m or less).

On the contrary, in the case of the present invention, since the torque required to relatively run the stationary side raceway ring and the rotary side raceway ring at 200 $min^{-1}$ based on the friction between the seal lip and the counter surface is regulated in a range of 0.06 to 0.4 N·m, the running torque can be reduced while assuring the durability.

In addition, since the torque required to relatively run the stationary side raceway ring and the rotary side raceway ring at 200 $min^{-1}$ based on the rolling resistance of the balls is regulated in a range of 0.15 to 0.45 N·m, the running torque of the wheel supporting rolling bearing unit as a whole can be suppressed sufficiently low (0.85 N·m or less) while assuring the controllability and the durability.

If the torque is lessened below 0.15 N·m, the preload must be lowered considerably and, as described above, the rigidity of the wheel supporting rolling bearing unit is not enough. Thus, the controllability of the vehicle into which the wheel supporting rolling bearing unit is incorporated is worsened.

In contrast, if the torque is enhanced so as to exceed 0.45 N·m, the increase of the preload is brought about. Thus, as described above, reduction in the durability of the wheel supporting rolling bearing unit is caused owing to the deterioration of the grease and the reduction in the rolling fatigue life, which are caused with an increase of the heating value at the rolling contact portion. Also, it is difficult to suppress the running torque of the wheel supporting rolling bearing unit as a whole sufficiently low.

In contrast, in the case of the present invention, since the torque required to relatively run the stationary side raceway ring and the rotary side raceway ring at 200 $min^{-1}$ based on the rolling resistance of the balls is regulated in a range of 0.15 to 0.45 N·m, the running torque can be reduced while assuring the controllability and the durability.

BEST MODE FOR CARRYING OUT THE INVENTION

First, three examples of a structure of a wheel supporting rolling bearing unit as the subject of the present invention will be explained hereinafter. In this case, the present invention has the structure shown in above FIGS. 10 and 11 as the subject, and first and second examples described in the following show the case where the present invention is applied to the wheel supporting rolling bearing unit used to support rotatably the driving wheel (rear wheel of the FR car, front wheel of the FF car, all wheels of the 4WD car). An importance of the present invention is particularly high as the wheel supporting rolling bearing unit for the driving wheel. The reason for this is that, in the case of the wheel supporting rolling bearing unit for the idler wheel (front wheel of the FR car, rear wheel of the FF car) shown in FIGS. 10 and 11, the seal rings (16a, 16d) on one end side can be omitted by sealing the opening on one end of the raceway ring (the hub 7 in FIG. 10, the outer ring 19 in FIG. 11) positioned on the outer diameter side by the cap 17 (FIG. 10) and thus only one seal ring that generates the sliding resistance can be provided, nevertheless two seal rings are required in the case of the wheel supporting rolling bearing unit for the driving wheel.

Figure 1:
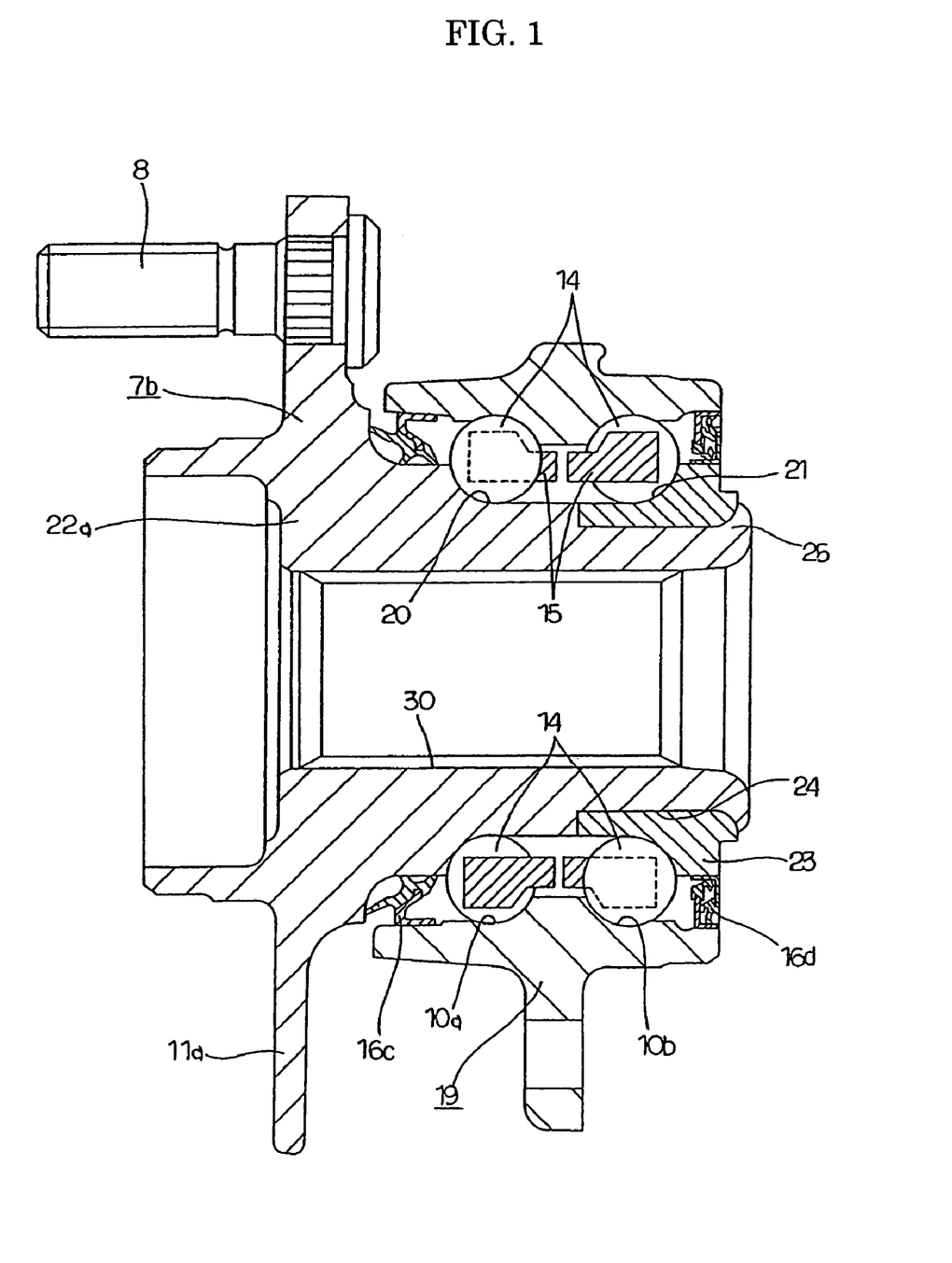
FIG. 1 is a sectional view showing a first example of a structure serving as a subject of the present invention.

First, like the above structure shown in FIG. 11, a first example shown in FIG. 1 supports rotatably the hub 7b as the rotary side raceway ring by a plurality of balls 14, 14 on the inner diameter side of the outer ring 19 as the stationary side raceway ring. A spline hole 30 into which a spline shaft (not shown) attached to the constant velocity joint is inserted is formed in a center portion of a hub main body 22a as the main shaft member constituting the hub 7b. Also, the inner ring 23 is fixed to the hub main body 22a by pressing the inner end portion of the inner ring 23, which is fitted onto the small-diameter stepped portion 24 formed in the inner end portion of the hub main body 22a, with the caulking portion 25, which is formed by elastically deforming the inner end portion of the hub main body 22a outward in the diameter direction, to constitute the hub 7b. Then, the space in which the balls 14, 14 are provided between the inner peripheral surface of the outer ring 19 and the outer peripheral surface of the hub 7b is isolated from the external space by providing the seal rings 16c, 16d between the inner peripheral surfaces on both end portions of the outer ring 19 and the outer peripheral surface of the middle portion of the hub main body 22a and the outer peripheral surface of the inner end portion of the inner ring 23 respectively.

In the case where the present invention is applied to such structure, an axial load to apply the preload to the balls 14, 14 is set to 1.96 to 4.9 kN by regulating a load that is applied to process the caulking portion 25 formed on the inner end portion of the hub main body 22a. Then, a torque (rolling resistance) that is required to turn the hub 7 on the inside of the outer ring 19 at 200 $min^{-1}$ is set to 0.15 to 0.45 N·m. Also, the rigidity factor is set to 0.09 or more. Further, the total running resistance (torque) of both seal rings 16c, 16d is regulated in a range of 0.06 to 0.4 N·m. Then, the entering of the foreign matter such as muddy water, or the like into the spaces in which the balls 14, 14 are provided is prevented by both seal rings 16c, 16d. Structures of other portions are similar to the above conventional structure shown in FIG. 11.

Figure 2:
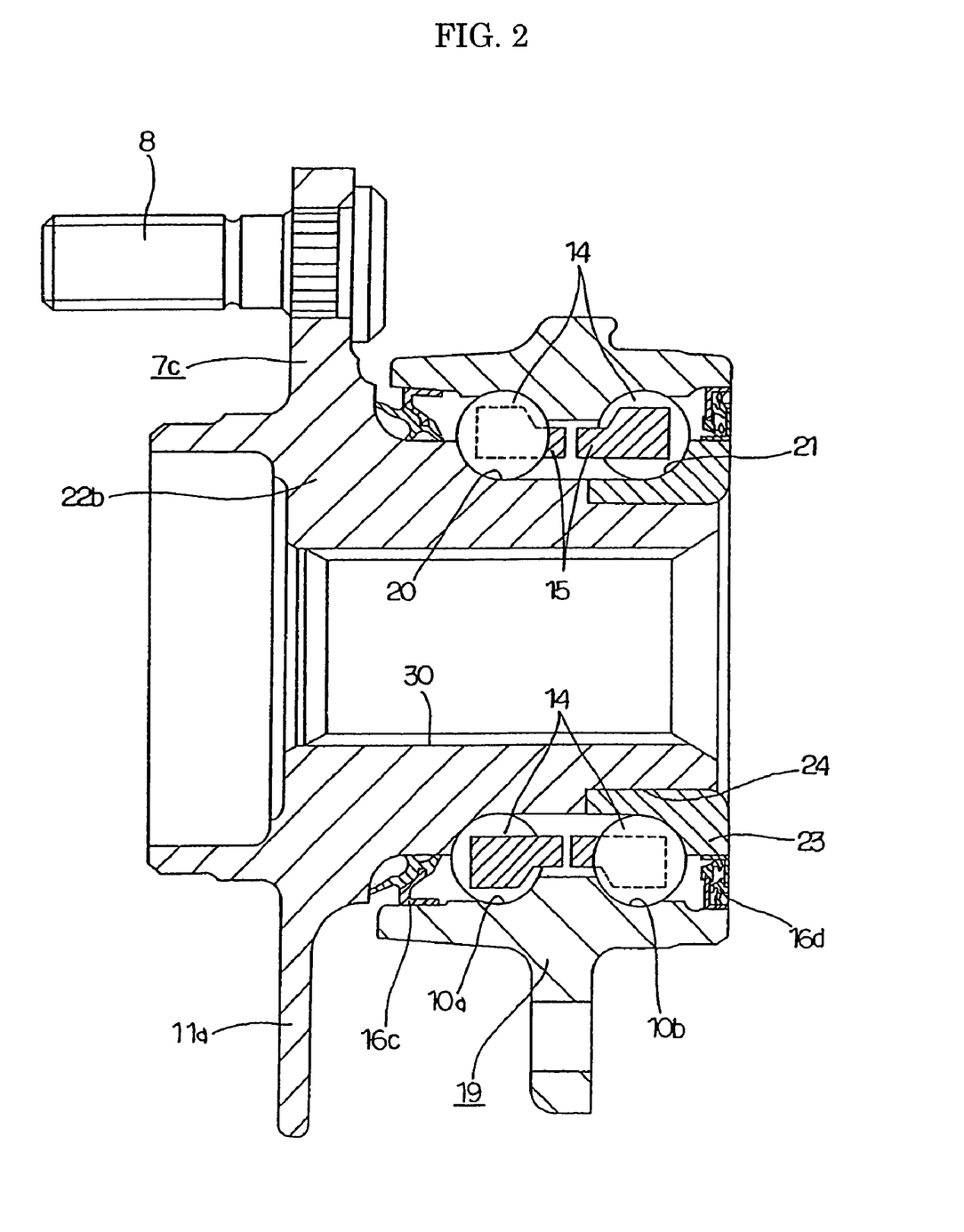
FIG. 2 is a sectional view showing a second example of the same.

Next, in the case of a second example shown in FIG. 2, the inner end surface of the inner ring 23 that is fitted onto the small-diameter stepped portion 24, which is provided to the inner end portion of the hub main body 22b as the main shaft member, to constitute the hub 7c as the rotary side raceway ring together with the hub main body 22b is protruded inward rather than the inner end surface of the hub main body 22b. When assembled into the vehicle, the outer end surface of the constant velocity joint (not shown) comes to the inner end surface of the inner ring 23 to prevent the removal of the inner ring 23 from the small-diameter stepped portion 24. The axial load to apply the preload is adjusted by the torque that is applied to tighten the nut that is screwed onto the outer end portion of the spline shaft (not shown). Other configurations are similar to those in the case in the first example shown in FIG. 1.

Figure 3:
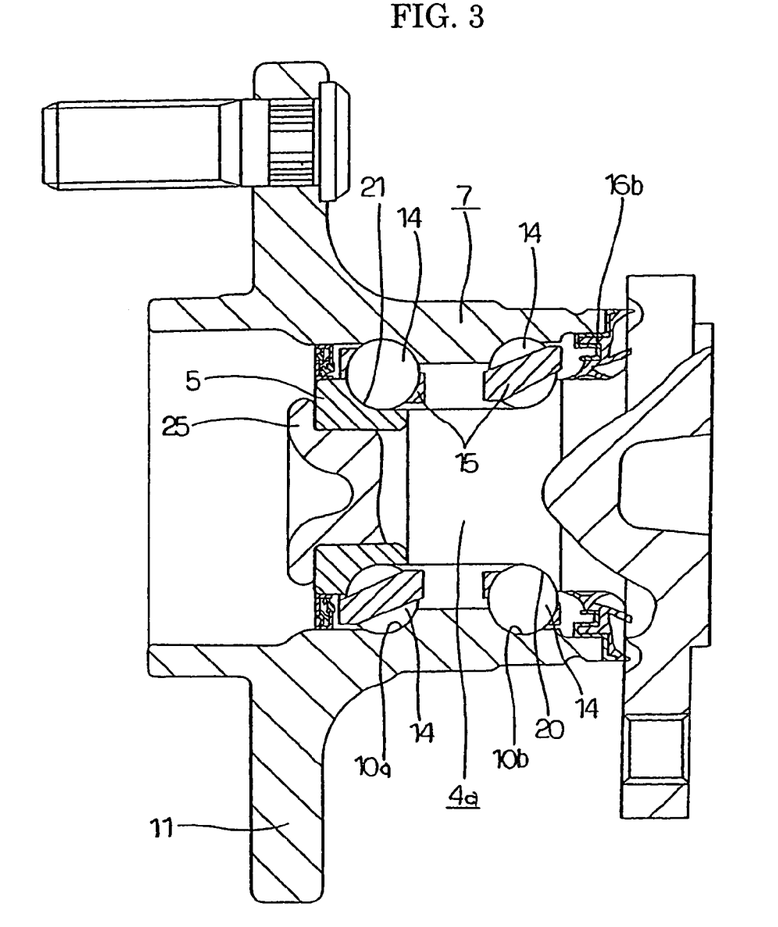
FIG. 3 is a sectional view showing a third example of the same.

Next, in the case of a third example shown in FIG. 3, the case where the present invention is applied to the wheel supporting rolling bearing unit that supports rotatably the idler wheel as shown in above FIG. 10 is shown. In the above structure shown in FIG. 10, a pair of inner rings 5, 5 are fixed by the nut 6 that is screwed onto the outer end portion of the supporting shaft 4a. In contrast, in the present embodiment, a first inner ring raceway ring 20 is formed directly on the middle portion of a supporting shaft 4a as a main shaft member, and also the inner ring 5 is fixed to the supporting shaft 4a by pressing the outer end surface of the inner ring 5 with the caulking portion 25 that is formed by elastically deforming an outer end surface of a supporting shaft 4b outward in the diameter direction. The axial load to apply the preload is adjusted by a load applied when the caulking portion 25 is worked. Structures and operations of other portions are similar to the first embodiment and the configuration shown in FIG. 10.

Next, five examples of a particular structure of a seal ring, which can be applied to the present invention, will be explained with reference to FIGS. 4 to 8 hereunder. These four examples shown in FIGS. 4 to 7 show a structure that can be utilized as the inside seal rings 16b, 16d in the first to third examples of the wheel supporting rolling bearing unit shown in FIGS. 1 to 3 and the structure explained previously in FIG. 11 respectively. Following explanation will be made by taking the case where the present invention is applied to the structure in FIGS. 1 and 2 as an example.

Figure 4:
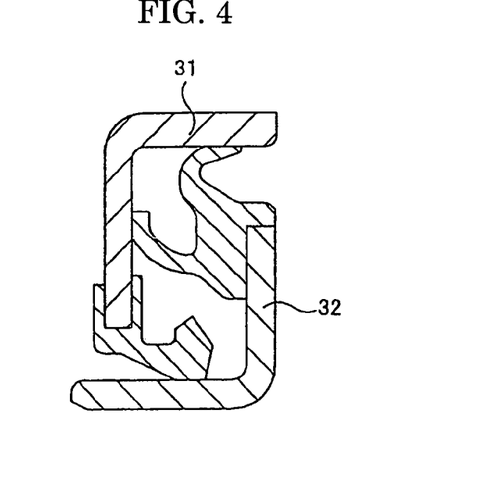
FIG. 4 is a partial sectional view showing a first example of a particular structure of a seal ring, which can be applied to the present invention.

First, a first example shown in FIG. 4 is a combinational seal ring in which an outer diameter-side seal ring 31 that is fitted/fixed into the inner end portion of the outer ring 19 (FIGS. 1 and 2) and an inner diameter-side seal ring 32 that is fitted/fixed onto the portion located near the inner ends of the inner ring 23 (FIGS. 1 and 2) are combined with each other. This seal ring has three seal lips in total, i.e., two on the inner diameter side and one on the outer diameter side.

Figure 5:
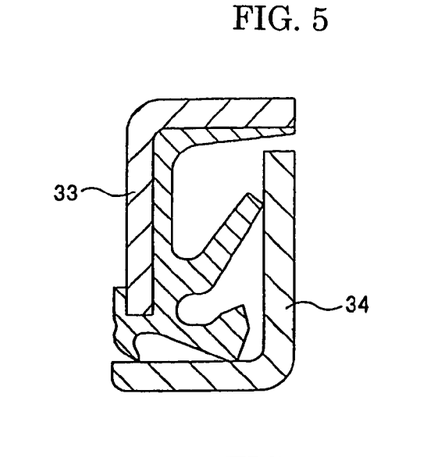
FIG. 5 is a partial sectional view showing a second example of the same.

Next, a second example shown in FIG. 5 is a combinational seal ring in which a seal ring 33 that is fitted/fixed into the inner end portion of the outer ring 19 (FIGS. 1 and 2) and a slinger 34 that is fitted/fixed onto the portion located near the inner ends of the inner ring 23 (FIGS. 1 and 2) are combined with each other. The seal ring 33 has three seal lips.

Figure 6:
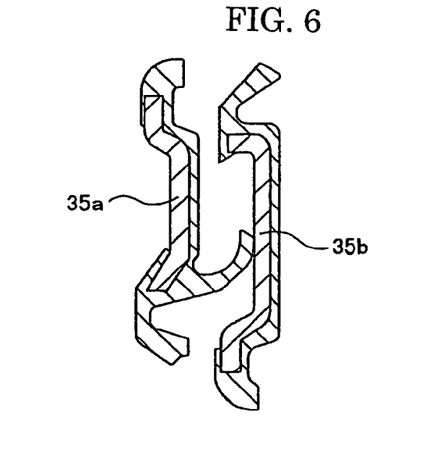
FIG. 6 is a partial sectional view showing a third example of the same.

Next, a third example shown in FIG. 6 is a combinational seal ring in which a seal ring 35a that engages with the inner peripheral surface of the inner end portion of the outer ring 19 (FIGS. 1 and 2) and a seal ring 35b that engages with the outer peripheral surface of the portion located near the inner ends of the inner ring 23 (FIGS. 1 and 2) are combined with each other. In the case of the present example, this seal ring has three seal lips in total, i.e., two on the seal ring 35a engaging with the outer ring 19 side and one on the seal ring 35b engaging with the inner ring 23 side.

Figure 7:
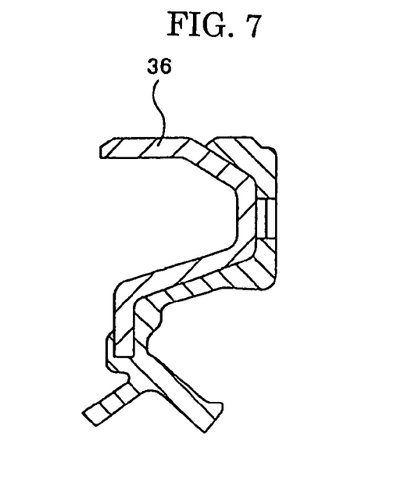
FIG. 7 is a partial sectional view showing a fourth example of the same.

Next, in a seal ring shown in FIG. 7, top end edges of two seal lips provided to a seal ring 36 that is fitted into the inner end portion of the outer ring 19 (FIGS. 1 and 2) slidingly come into contact with the outer peripheral surface of the portion located near the inner ends of the inner ring 23 (FIGS. 1 and 2). In this case, the seal ring 36 shown in FIG. 7 can also be used to block the opening portion on the outer end side of the space in which the balls are provided.

Figure 8:
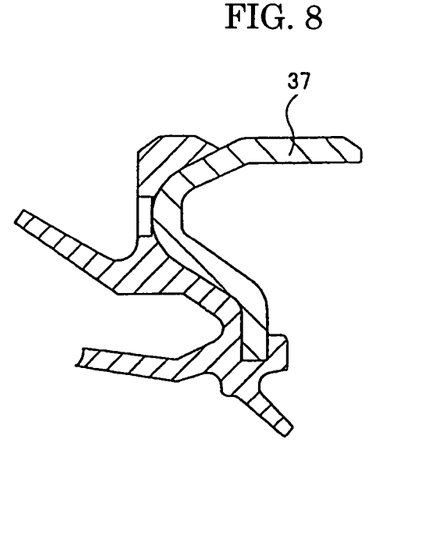
FIG. 8 is a partial sectional view showing a fifth example of the same.

Next, a seal ring 37 shown in FIG. 8 shows a structure that can be utilized as a seal ring that is provided between the inner peripheral surface of the outer end portion of the outer ring 19 (FIGS. 1 and 2) or the inner end portion (FIG. 3) of the hub 7 and the outer peripheral surface of the middle portion of the hub main bodies 22a (FIG. 1), 22b (FIG. 2) and the supporting shaft 4a (FIG. 3). In this seal ring 37, three seal lips are provided to the core bar that can be fitted/fixed into the outer end portion of the outer ring 19, and the top end edges of these seal lips are slidingly brought into contact with the inside surface of the fitting flange 11a (FIGS. 1 to 3) or the curved-surface portion that connects continuously this inside surface and the outer peripheral surfaces of the hub main bodies 22, 22a.

The opening portions on both end portions of the space in which the balls 14, 14 are provided are sealed by assembling a pair of seal rings selected from those shown in FIGS. 4 to 8 between the inner peripheral surface of the outer end portion of the outer ring 19 (FIGS. 1 and 2), which constitutes the wheel supporting rolling bearing unit shown in FIGS. 1 to 3, or the inner end portion (FIG. 3) of the hub 7 and the outer peripheral surface of the middle portion of the hub main bodies 22a (FIG. 1), 22b (FIG. 2) and the supporting shaft 4a (FIG. 3) and the outer peripheral surface of the inner end portion of the inner ring 23 (FIGS. 1 and 2), and the outer peripheral surface of the outer end portion (FIG. 3) of the inner ring 5. Then, even when any seal rings are combined with each other, the total running resistance of both seal rings is adjusted in a range of 0.06 to 0.4 N·m by the method described later, for example. Also, the running resistance of the seal ring that has the lower running resistance is lowered by the method described later but is kept to 0.3 N·m or more.

In this event, as the method of reducing the torque required for the relative rotation between the seal ring and the counter member when any one of the above seal rings is employed, there are methods (1) to (4) described as follows, for example. These methods may be employed solely or in combination respectively.

(1) To reduce a thickness of the seal lip.

In this case, the rigidity of the seal lip is lowered, then a contact pressure of the contact portion between the top end edge of the seal lip and the counter surface is lowered, and then the torque can be reduced.

(2) To eliminate substantially an interference of the top end edge of the seal lip, which is arranged closest to the internal space in which the balls are provided, out of thee seal lips.

In this case, the concerned seal lip and the counter surface constitute a labyrinth seal. Then, a frictional resistance of the concerned seal lip becomes 0.

(3) To use the material having a small frictional resistance rather than the nitrile rubber that is normally used at present, as the elastic material constituting the seal lip.

As the elastic material that has a small frictional resistance and is available in this case, as set forth in above Patent Literature 3 (JP-A-8-319379), the material obtained by mixing the plastic fine grains, which are impregnated with the lubricant, into the rubber composition constituting the seal member may be employed.

(4) To devise a sectional shape of the seal lip.

Figure 9:
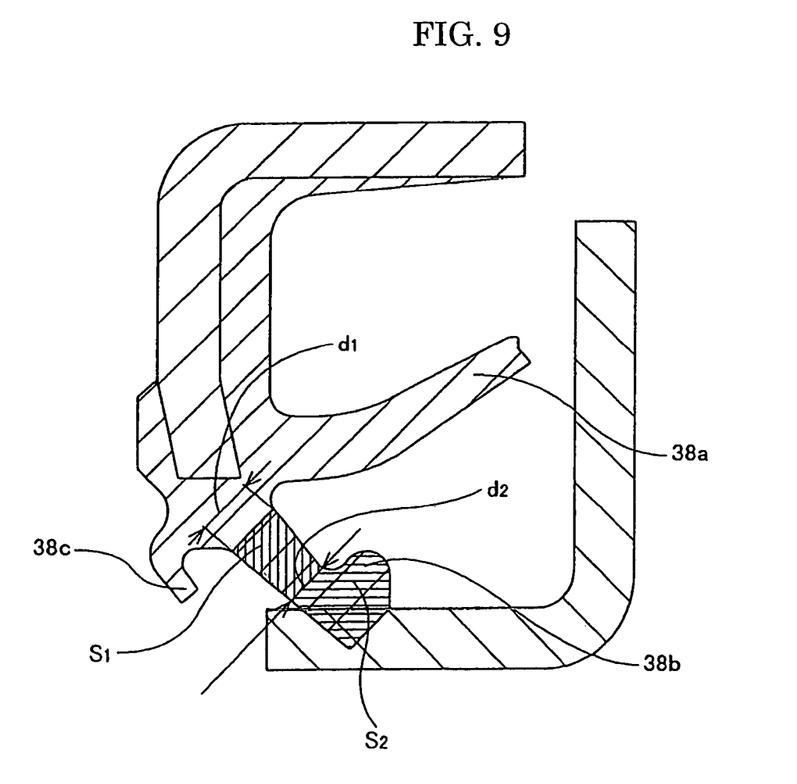
FIG. 9 is a partial sectional view showing a first example of a structure that can reduce a slide resistance.

As the sectional shape that is available in this case, the sectional shape in the prior invention disclosed in Patent Application No. 2002-71338, for example, may be considered. In the structure in the prior invention, as shown in FIG. 9, a thickness of a seal lip 38b of three seal lips 38a, 38b, 38c is reduced gradually from the base end portion toward the middle portion and then is increased from the middle portion toward the top end portion. Also, a thickness of the seal lip 38b is maximized at a part of the portion located near the top end. In addition, the shape is decided to satisfy $$0.80 d_1 \leq d_2 \leq 0.98 d_1 \text{ and } 0.1 s_2 \leq s_1 \leq 0.5 s_2$$

where $d_1$ is a thickness of the base end portion of the seal lip 38b, $d_2$ is a thickness of a minimum thickness portion in which a thickness is minimized in the middle portion, $s_1$ is a sectional area of a portion extended from the base end portion to the minimum thickness portion in the axial direction, and $s_2$ is an area of a portion extended from the minimum thickness portion to the top end edge.

EXAMPLES

Next, results of experiments to check advantages of the present invention will be explained hereunder. In Experiment, a pair of seal rings selected from five types of seal rings shown in FIGS. 4 to 8 were assembled into the wheel supporting rolling bearing unit shown in FIG. 1 or FIG. 3, and then the relationship between a total value of the running resistance (seal torque) of both seal rings and the sealing performance was obtained. Adjustment of the sealing torque was executed by adjustment of the interference (an amount of elastic deformation) of the seal lip, adjustment of the thickness of the seal lip, exchange of the elastic material, and adjustment of the contact conditions to the counter surface. Then, six types of seal rings whose seal torque is 0.01 to 0.10 N·m were manufactured with respect to above five types of seal rings respectively. Then, respective seal rings were incorporated into the wheel supporting rolling bearing unit shown in FIG. 1 or FIG. 3 to take a muddy-water entering test. In this muddy-water entering test, as one cycle, the step of running relatively the seal rings and the member having the counter surface while pouring the muddy water on the area, in which the seal ring is provided, at a rate of 3000 cc/min was continued for 17 hours and then the step of drying the concerned area by stopping the rotation and the pouring of the muddy water was continued for 3 hours. These steps were repeated in 20 cycles every sample. Also, the lubrication of the wheel supporting rolling bearing unit was executed by injecting a grease whose viscosity is $10 \times 10^{-6}$ to $14 \times 10^{-6}$ m²/s (10 to 14 cSt). The hub $7b$ (or $7$) were revolved at 200 min$^{-1}$ in the environment of 20° C.

Results of the experiment executed under such conditions are given in Table 1.

TABLE 1

| Seal torque (N·m) | ④ + ⑧ | ④ + ⑦ | ⑤ + ⑧ | ⑤ + ⑦ | ⑥ + ⑧ | ⑥ + ⑦ |
|---|---|---|---|---|---|---|
| 0.01 | X | X | X | X | X | X |
| 0.03 | ○ | X | Δ | X | X | X |
| 0.05 | ○ | Δ | ○ | Δ | Δ | Δ |
| 0.06 | ○ | ○ | ○ | ○ | ○ | ○ |
| 0.08 | ○ | ○ | ○ | ○ | ○ | ○ |
| 0.10 | ○ | ○ | ○ | ○ | ○ | ○ |

Here, in Table 1, encircled figures represent the drawing number in which the seal ring is set forth respectively. For example, ④ represents the seal ring shown in FIG. 4 and ⑧ represents the seal ring shown in FIG. 8. Also, ④+⑧ represents a combination of the seal ring shown in FIG. 4 and the seal ring shown in FIG. 8. Also, a mark "×" indicates the fact that a large amount of muddy water entered into the internal space in which the grease is sealed, a mark "Δ" indicates the fact that a small amount of muddy water entered into the same, and a mark "○" indicates the fact that the entering of the muddy water was not observed. It is appreciated based on such experimental results that, if the seal torque is in excess of 0.06 N·m, the entering of the muddy water can be prevented by all seal rings.

Next, second to fifth Experiments that were executed by incorporating the seal ring shown in FIG. 5 and the seal ring shown in FIG. 9 into the wheel supporting rolling bearing unit shown in FIG. 8 to know the influences of the seal torque (running resistance), the axial load to apply the preload, the rolling resistance, and the rigidity factor upon the controllability, the running torque of the overall rolling bearing unit, and the durability will be explained with reference to Tables 2 to 5. In Tables 2 to 5, a mark "×" indicates the fact that the problem arose in practical use in any respect, a mark "Δ" indicates the fact that the problem slightly arose in practical use in any respect, and a mark "○" indicates the fact that no problem arose in all respects. Here, second to fifth Experiments were carried out three times under the same conditions respectively.

First, Table 2 gives results of second Experiment that was executed to know the influence of the seal torque upon the running torque of the overall rolling bearing unit and the durability. This Experiment was executed at a rotational speed of 200 min$^{-1}$.

TABLE 2

| Seal torque[N · m] | Evaluation | | |
|---|---|---|---|
| 0.01 | X | X | X |
| 0.03 | X | Δ | X |
| 0.05 | ○ | ○ | ○ |
| 0.06 | ○ | ○ | ○ |
| 0.10 | ○ | ○ | ○ |
| 0.35 | ○ | ○ | ○ |
| 0.40 | ○ | ○ | ○ |
| 0.55 | X | X | X |
| 0.70 | X | X | X |

As the result of second Experiment given in Table 2, it was understood that, if the seal torque is in a range of 0.06 to 0.40 N·m, the satisfactory performance can be obtained in both respects of the running torque of the overall rolling bearing unit and the durability. In contrast, if the seal torque is at 0.01 N·m and 0.03 N·m, the entering of the foreign matter such as the muddy water, or the like into the internal space in which the balls 14, 14 are provided could not sufficiently prevented, and thus the problem arose in the respect of assuring the durability. In contrast, if the seal torque is at 0.55 N·m and 0.70 N·m, the running torque of the overall rolling bearing unit could not be suppressed low. In this case, from the result of the second experiment whose results are given in Table 2, the good performances were obtained in a combination "⑤+⑧" when the seal torque was 0.05 N·m. From the result of the second experiment whose results are given in Table 1, the lower limit of the seal torque was 0.06 N·m.

Next, Table 3 gives results of third Experiment that was executed to know the influence of the axial load (preload) upon the rigidity of the rolling bearing unit and the durability.

TABLE 3

| Preload [kN] | Evaluation | | |
|---|---|---|---|
| 0.49 | X | X | X |
| 0.98 | X | Δ | Δ |
| 1.96 | ○ | ○ | ○ |
| 2.94 | ○ | ○ | ○ |
| 3.92 | ○ | ○ | ○ |
| 4.90 | ○ | ○ | ○ |
| 5.88 | Δ | Δ | Δ |
| 6.86 | X | Δ | X |

As the result of third Experiment given in Table 3, it was understood that, if the axial load is in a range of 1.96 to 4.90 N·m, the satisfactory performance can be obtained in both respects of the controllability and the durability of the rolling bearing unit. In contrast, if the axial load is at 0.49 kN and 0.98 kN, the rigidity of the rolling bearing unit was low and thus the sufficient controllability could not be assured. In contrast, if the axial load is at 5.88 kN and 6.86 kN, the rolling resistance was increased and the durability of the rolling bearing unit was degraded.

Next, Table 4 gives results of fourth Experiment that was executed to know the influence of the rolling resistance upon the rigidity of the rolling bearing unit and the durability. This Experiment was executed at a rotational speed of 200 min$^{-1}$.

TABLE 4

| Rolling Resistance [N · m] | Evaluation | | |
|---|---|---|---|
| 0.10 | X | X | X |
| 0.12 | Δ | Δ | X |
| 0.15 | ○ | ○ | ○ |
| 0.25 | ○ | ○ | ○ |
| 0.35 | ○ | ○ | ○ |
| 0.45 | ○ | ○ | ○ |
| 0.55 | X | Δ | Δ |
| 0.65 | X | X | X |

As the result of fourth Experiment given in Table 4, it was understood that, if the rolling resistance is in a range of 0.15 to 0.45 N·m, the satisfactory performance can be obtained in both respects of the controllability and the durability of the rolling bearing unit. In contrast, if the rolling resistance is at 0.10 N·m and 0.12 N·m, the rigidity of the rolling bearing unit was low and thus the sufficient controllability could not be assured. In contrast, if the rolling resistance is at 0.55 N·m and 0.65 N·m, the durability of the rolling bearing unit was degraded.

In addition, Table 5 gives results of fifth Experiment that was executed to know the influence of the rigidity factor upon the rigidity of the rolling bearing unit.

TABLE 5

| Rigidity factor | Evaluation | | |
|---|---|---|---|
| 0.07 | X | X | X |
| 0.08 | X | X | Δ |
| 0.09 | ○ | ○ | ○ |
| 0.10 | ○ | ○ | ○ |
| 0.15 | ○ | ○ | ○ |
| 0.18 | ○ | ○ | ○ |

As the result of fifth Experiment given in Table 5, it was understood that, if the rigidity factor is 0.09 or more, the satisfactory performance of the controllability can be obtained. In contrast, if the rigidity factor is at 0.07 and 0.08, the rigidity of the rolling bearing unit was low and thus the sufficient controllability could not be assured. In this case, as described above, the higher rigidity factor is better insofar as other requirements are satisfied.

Next, Table 6 gives results of Experiment that was executed to know the influences of the seal torque and the rolling resistance upon the running torque of the rolling bearing unit as a whole. This Experiment was executed at a rotational speed of 200 min$^{-1}$.

TABLE 6

| | | Seal torque [N · m] | | |
|---|---|---|---|---|
| | | 0.35 | 0.4 | 0.55 |
| Rolling | 0.35 | ○ | ○ | Δ |
| Resistance | 0.45 | ○ | ○ | X |
| [N · m] | 0.55 | Δ | X | X |

In Table 6, a mark "X" indicates the fact that the running torque was large as a whole, a mark "Δ" indicates the fact that the running torque was slightly large, and a mark "○" indicates the fact that the running torque was small. As apparent from this Table 6, the present invention in which a total seal torque of a pair of seal rings and the rolling resistance are suppressed to 0.4 N·m or less and 0.45 N·m or less respectively could suppress as a whole the running torque low such as 0.85 N·m or less.

TABLE 7

| No | Preload [kN] | Rolling torque [N · m] (measured at 200 min$^{-1}$) | Rigidity factor | Ball Diameter [mm] | PCD[mm] | Inter-row distance [mm] | Contact angle[deg] |
|---|---|---|---|---|---|---|---|
| 1 | 1.96 | 0.152 | 0.093 | φ 9.525 | 46 | 24 | 40 |
|   | 4.9  | 0.448 | 0.102 | φ 9.525 | 46 | 24 | 40 |
| 2 | 1.96 | 0.150 | 0.091 | φ 12.7  | 51 | 35 | 40 |
|   | 4.9  | 0.445 | 0.100 | φ 12.7  | 51 | 35 | 40 |

In Table 7, the ball diameter denotes a diameter of the ball, the PCD denotes a pitch diameter of a ball sequence of these balls, the inter-row distance denotes a pitch (center distance between the balls) of the ball sequences arranges in double rows in the axial direction, and the contact angle denotes a contact angle between the balls and the inner ring raceway and the outer ring raceway.

Also, the influence of the contact angle upon the rigidity factor is given in Table 8. It was appreciated from Table 8 that the rigidity factor becomes small as the contact angle becomes small.

TABLE 8

| Preload [kN] | Contact angle [deg] | Rigidity factor | Ball Diameter [mm] | PCD [mm] | Inter-row Distance [mm] |
|---|---|---|---|---|---|
| 1.96 | 40 | 0.093 | φ 9.525 | 45 | 24 |
| 1.96 | 35 | 0.089 | φ 9.525 | 45 | 24 |

The present invention is explained in detail with reference to particular embodiments, but it is apparent for the person skilled in the art that various variations and modifications can be applied without departing from a spirit and a scope of the present invention.

The present application was filed based on Japanese Patent Application (Patent Application No. 2002-261194) filed on Sep. 6, 2002 and the contents thereof are incorporated herein by the reference.

INDUSTRIAL APPLICABILITY

Since the wheel supporting rolling bearing unit of the present invention is constructed and acts as described above, such bearing unit can contribute to the improvement in the running performances of the vehicle, mainly the controllability, the acceleration performance, and the fuel consumption performance, by reducing the running torque of the hub, which rotates together with the wheel, while assuring the rigidity and the durability.

An example of a trial calculation to improve the fuel consumption performance will be explained hereunder. The running resistance of the wheel supporting rolling bearing unit having the above structure shown in FIGS. 1 to 3 was almost 1.5 N·m in the prior art. In contrast, the running resistance of the wheel supporting rolling bearing unit of the present invention is in a range of 0.21 to 0.85 N·m. That is, the running resistance is lowered by 43% or more rather than the prior art. It is considered that, if the running resistance of the wheel supporting rolling bearing unit is lowered by 10%, the fuel consumption (fuel consumption ratio) can be improved by about 0.1%. Therefore, suppose that the car the fuel consumption of which is about 10 km/L travels 100,000 km a year, the fuel can be saved by about 43 to 86 L a year by employing the wheel supporting rolling bearing unit of the present invention. Suppose that 1,000,000 cars travel in this country, the fuel that can be saved a year reaches 43,000,000 L to 86,000,000 L. In addition, it is possible to say that the industrial usability is extremely high because the fuel consumption can be improved not to cause other disadvantages.

The invention claimed is:

1. A wheel supporting rolling bearing unit comprising:
   a stationary side raceway ring supported/fixed on a suspension system in use;
   a rotary side raceway ring for supporting/fixing a wheel in use;
   a plurality of balls provided between a stationary side raceway surface and a rotary side raceway surface, each of which has a circular-arc sectional shape, on mutually opposing peripheral surfaces of the stationary side raceway ring and the rotary side raceway ring; and
   a pair of seal rings for sealing opening portions on both end portions of a space in which the balls are provided between the mutually opposing peripheral surfaces of the stationary side raceway ring and the rotary side raceway ring;
   wherein one raceway ring, which is positioned inside in a radial direction, out of the stationary side raceway ring and the rotary side raceway ring consists of a main shaft member and an inner ring, the main shaft member has a first inner ring raceway formed directly in a middle portion of an outer peripheral surface in an axial direction to serve as the stationary side raceway surface or the rotary side raceway surface and a small-diameter stepped portion formed on one end portion of the outer peripheral surface in the axial direction, and the inner ring on an outer peripheral surface of which a second inner ring raceway as the stationary side raceway surface or the rotary side raceway surface is formed is fitted/fixed onto the small-diameter stepped portion,
   the pair of seal rings have two or three seal lips which are formed of elastic material respectively and a top end edge of each of which slidingly comes into contact with a counter surface,
   wherein an axial load to apply a preload to the balls is set to 1.96 to 4.9 kN,
   a rigidity factor is set to 0.09 or more,
   a torque required to relatively run the stationary, side raceway ring and the rotary side raceway ring at 200 $\min^{-1}$ based on a friction between the seal lips provided to both seal rings and a counter surface is set to 0.06 to 0.4 N·m in total in both seal rings, and
   a torque required to relatively run the stationary side raceway ring and the rotary side raceway ring at 200 $\min^{-1}$ based on a rolling resistance of each ball is set to 0.15 to 0.45 N·m.

2. A wheel supporting rolling bearing unit according to claim 1, wherein the inner ring is pressed by a caulking portion, which is formed by elastically deforming one end portion of the main shaft member outward in the radial direction, at one end surface.

* * * * *